(No Model.)  6 Sheets—Sheet 1.

W. H. CLARK.
CASH INDICATOR AND REGISTER.

No. 435,398.  Patented Sept. 2, 1890.

WITNESSES
F. J. Barrett
G. J. Mead.

INVENTOR
William H. Clark
By H. Sturgess
Atty.

(No Model.)  6 Sheets—Sheet 2.
W. H. CLARK.
CASH INDICATOR AND REGISTER.

No. 435,398. Patented Sept. 2, 1890.

Witnesses  
F. J. Bassett  
G. J. Mead

Inventor  
William H. Clark  
By H. Sturges  
Atty.

(No Model.) 6 Sheets—Sheet 3.

W. H. CLARK.
CASH INDICATOR AND REGISTER.

No. 435,398. Patented Sept. 2, 1890.

Witnesses
F. J. Bauer
G. J. Mead.

Inventor
William H. Clark
By A. H. Sturgeon
Atty.

(No Model.) 6 Sheets—Sheet 4.

W. H. CLARK.
CASH INDICATOR AND REGISTER.

No. 435,398. Patented Sept. 2, 1890.

Witnesses
Inventor
William H. Clark
By his Atty.

(No Model.) 6 Sheets—Sheet 5.
W. H. CLARK.
CASH INDICATOR AND REGISTER.

No. 435,398. Patented Sept. 2, 1890.

WITNESSES
INVENTOR
William H. Clark (No Model.)     6 Sheets—Sheet 6.

W. H. CLARK.
CASH INDICATOR AND REGISTER.

No. 435,398.     Patented Sept. 2, 1890.

Witnesses
F. J. Barrett
G. J. Mead

Inventor
William H. Clark
By H. Sturgeon
atty.

UNITED STATES PATENT OFFICE.

WILLIAM H. CLARK, OF ALBION, ASSIGNOR OF ONE-FOURTH TO THE LOVELL MANUFACTURING COMPANY, LIMITED, OF ERIE, PENNSYLVANIA.

CASH INDICATOR AND REGISTER.

SPECIFICATION forming part of Letters Patent No. 435,398, dated September 2, 1890.

Application filed November 12, 1889. Serial No. 330,104. (No model.)

*To all whom it may concern:*

Be it known that I, WILLIAM H. CLARK, a citizen of the United States, residing at Albion, in the county of Erie and State of Pennsylvania, have invented certain new and useful Improvements in Cash Indicators and Registers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in cash indicators and registers hereinafter set forth and explained, and illustrated in the accompanying drawings, in which—

Figure 1:
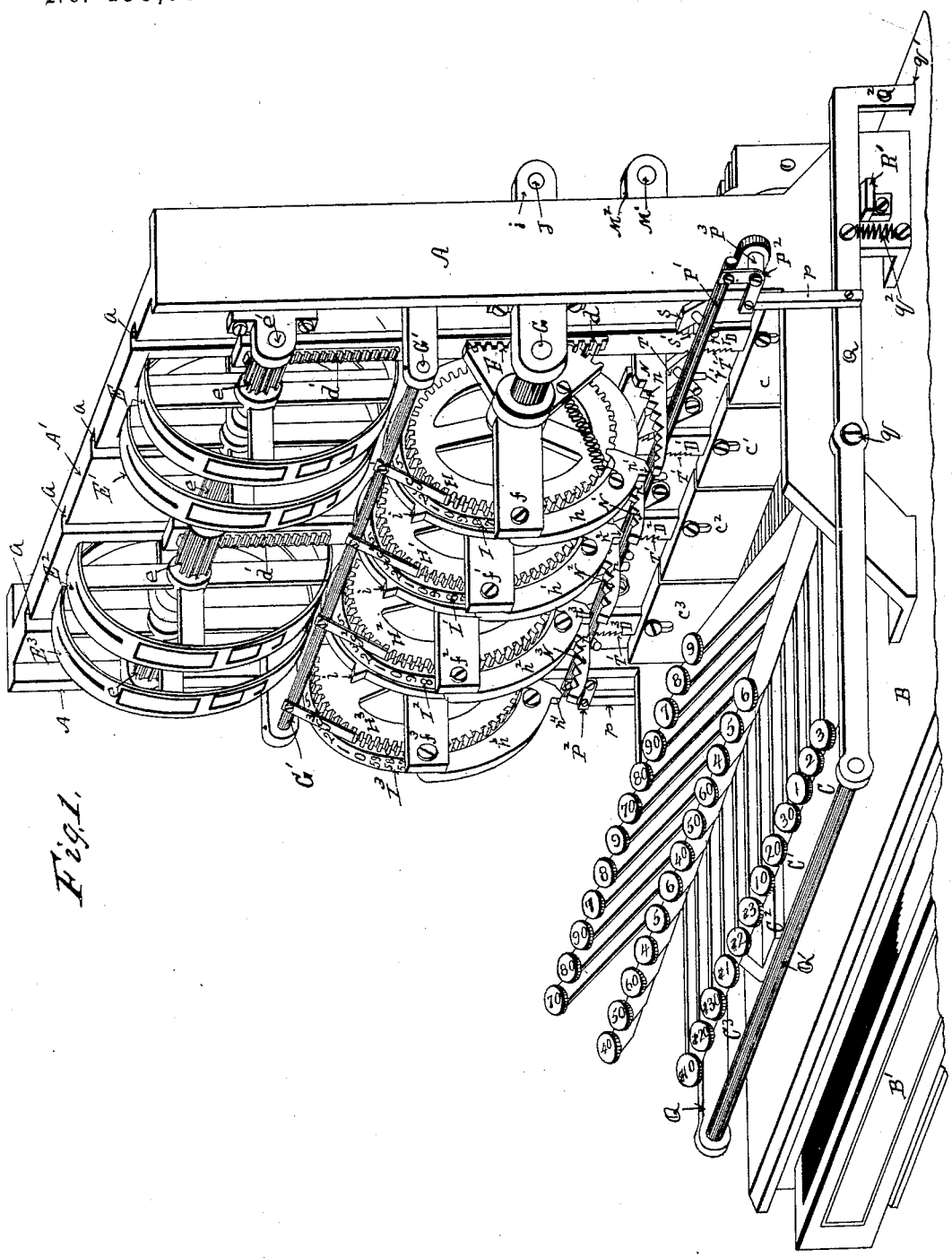
Figure 2:
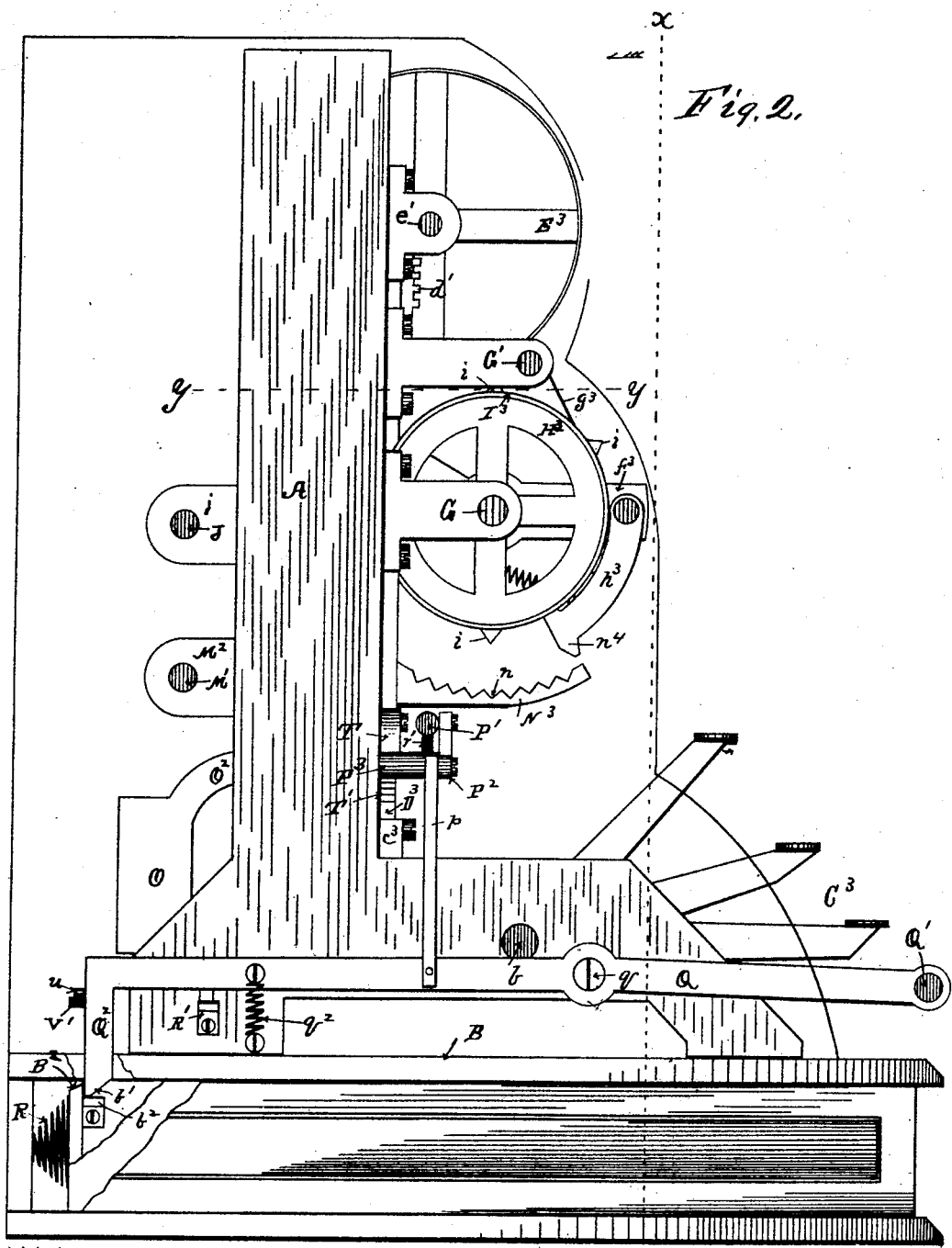
Figure 3:
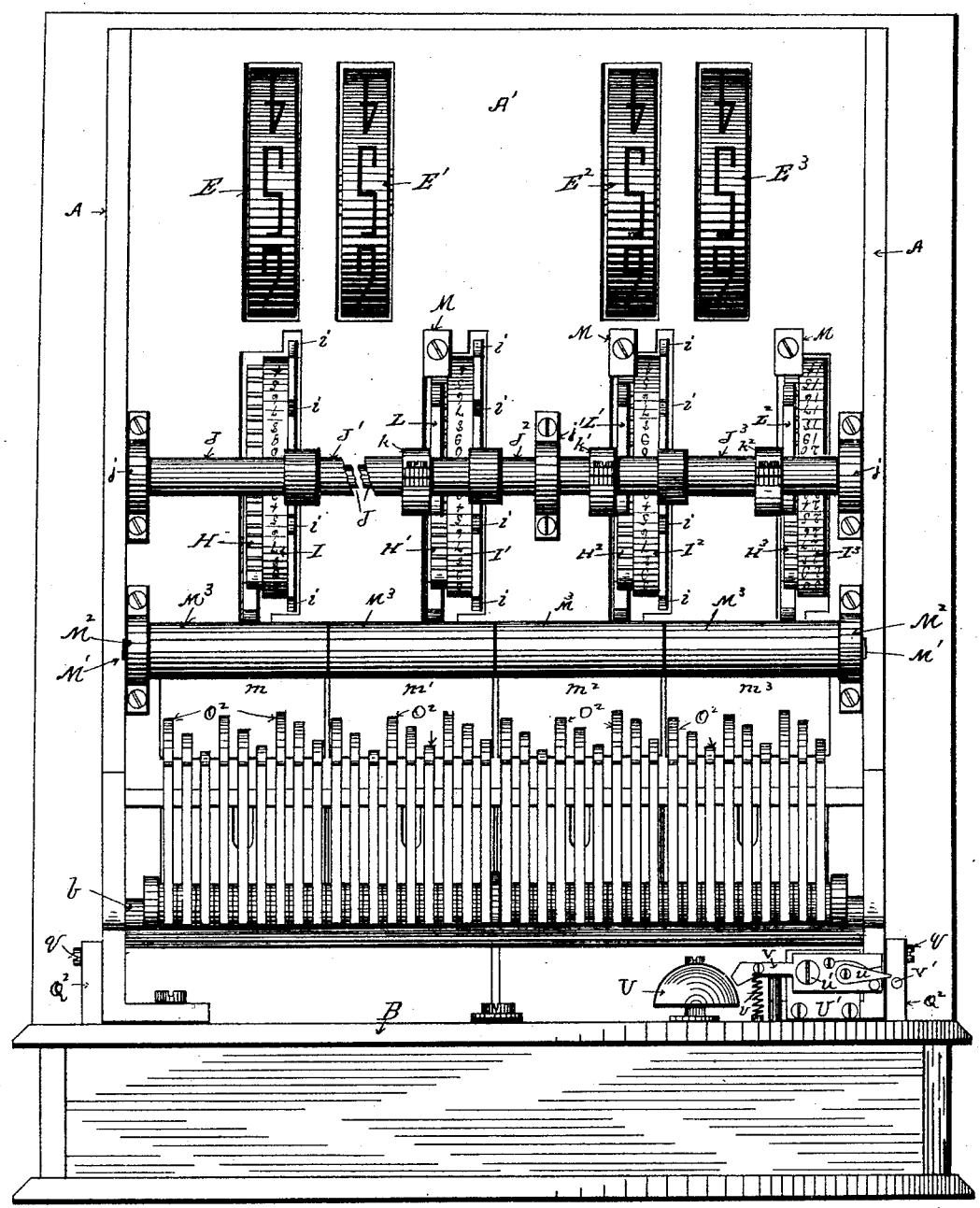
Figure 4:
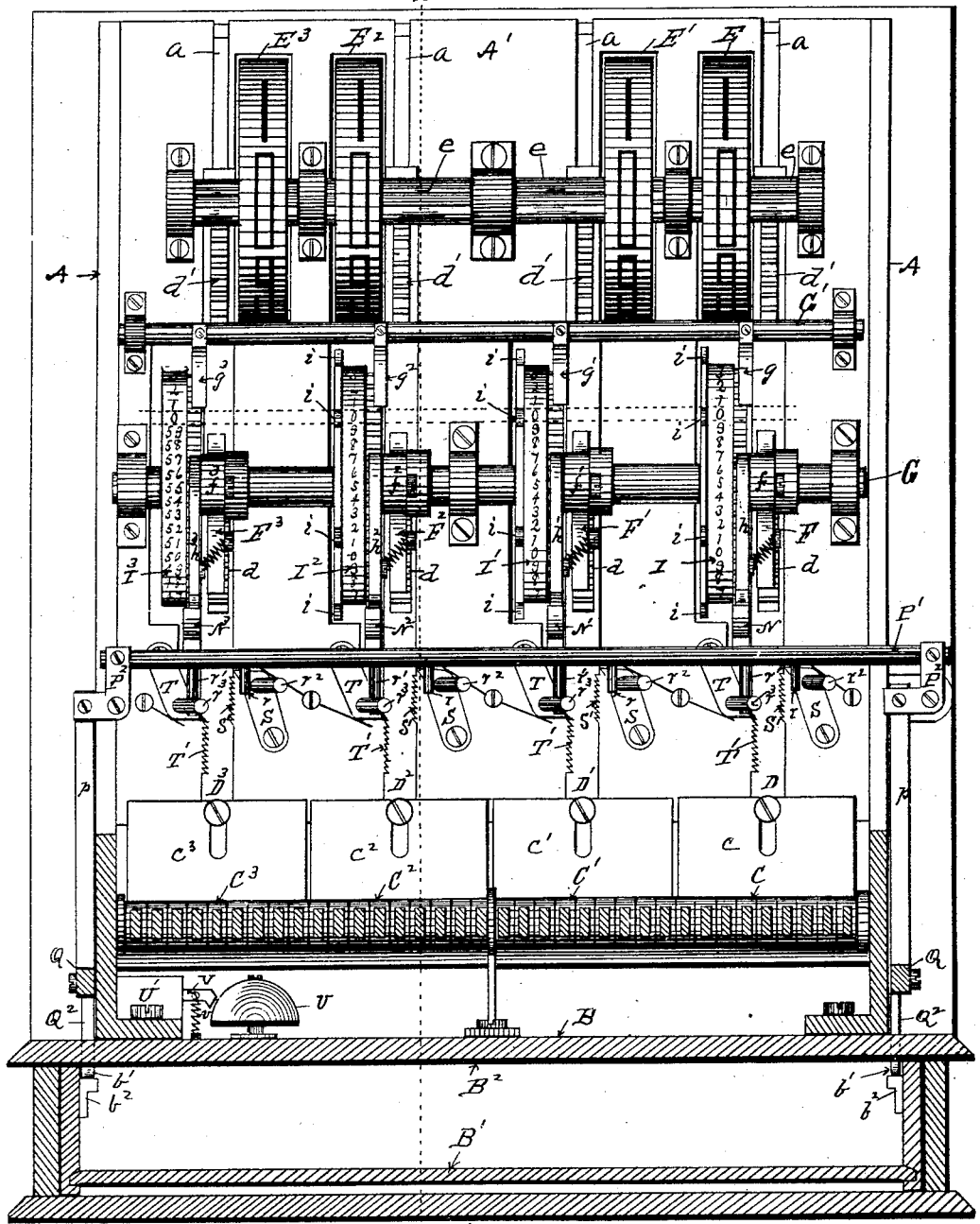
Figure 5:
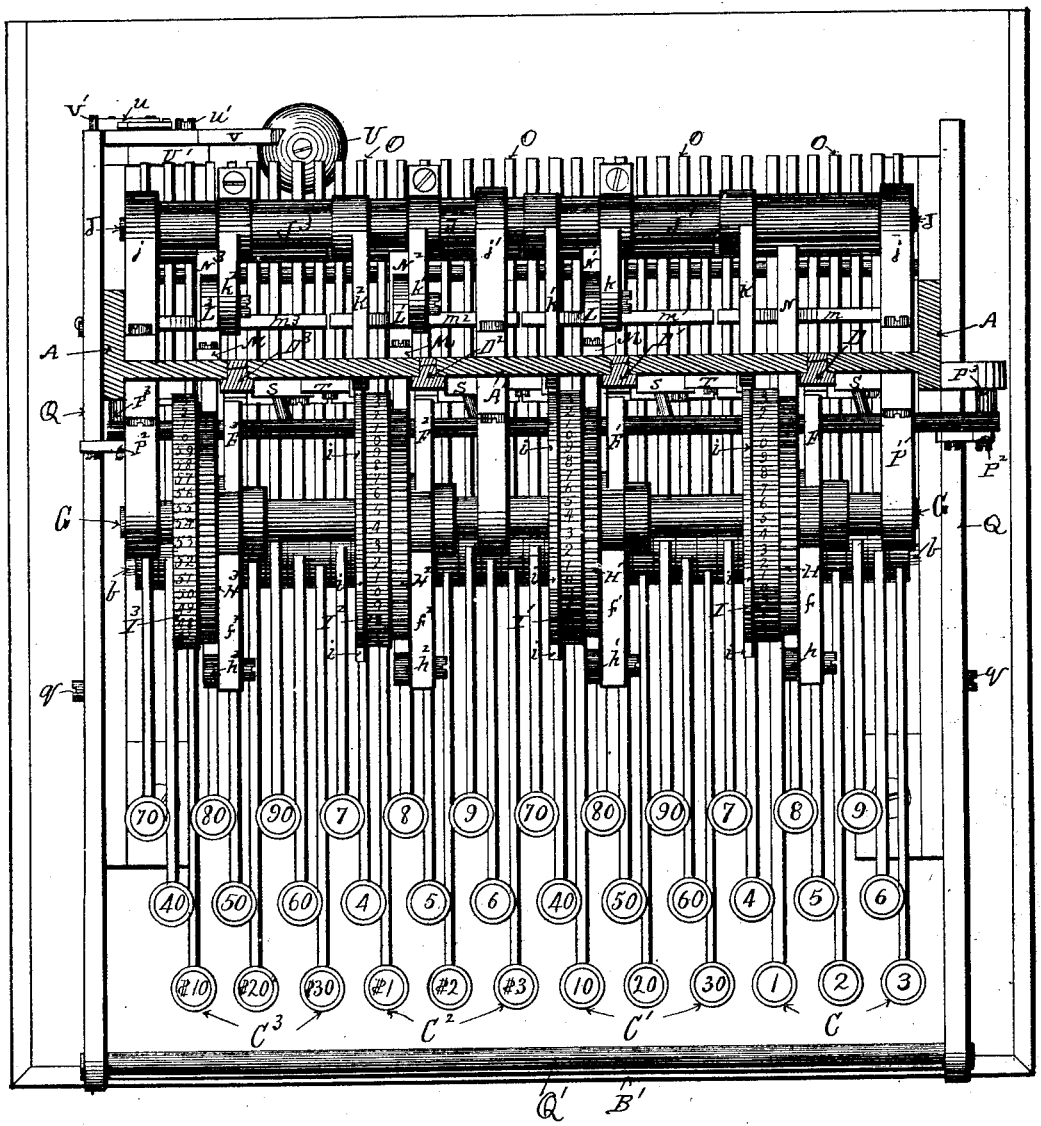
Figure 6:
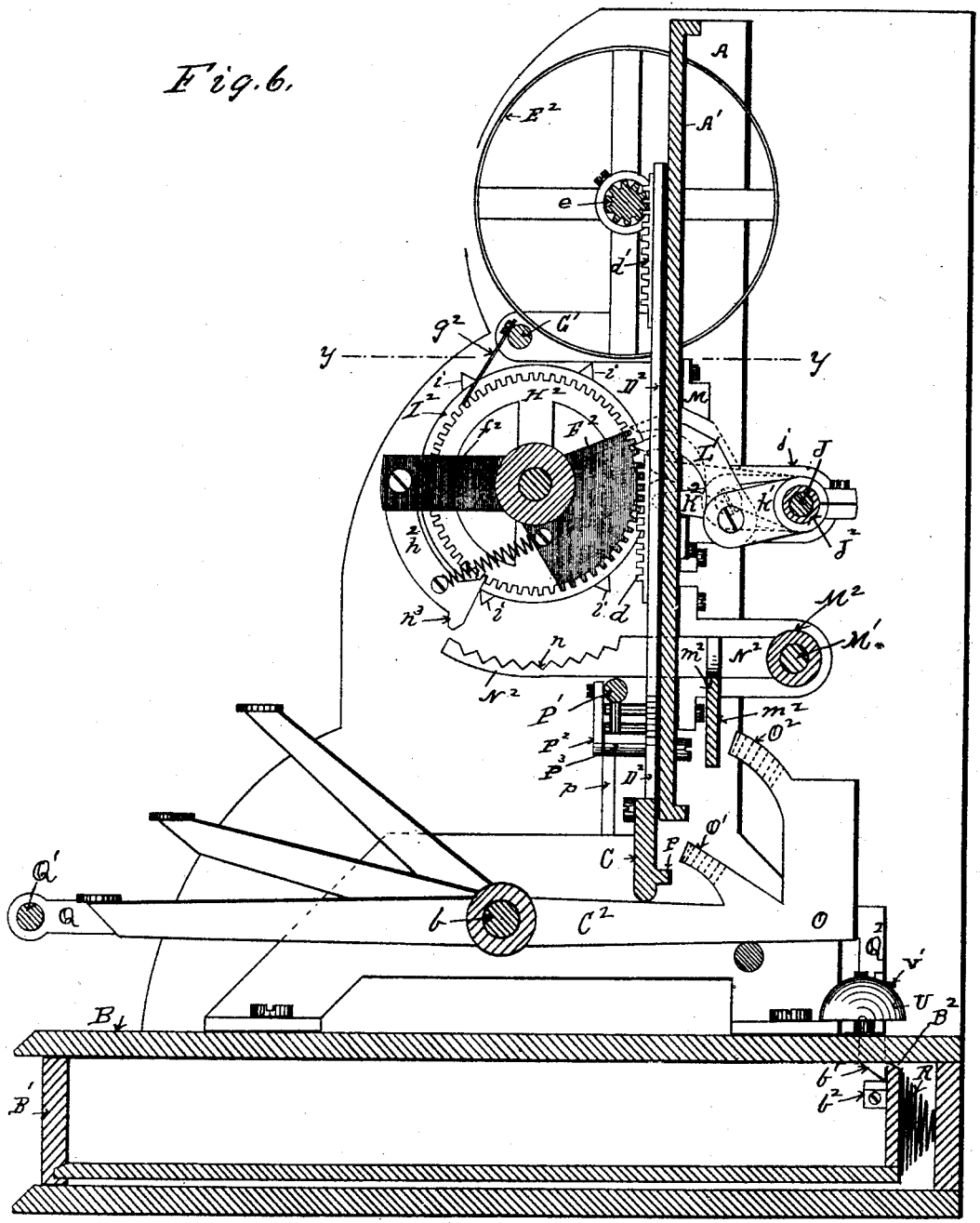

Figure 1 is a perspective view of my machine, a portion of the base thereof being broken away. Fig. 2 is an end elevation of the same. Fig. 3 is a rear elevation of the same. Fig. 4 is a front view of the same, partially in elevation and partially in section, on the line $x\ x$ in Fig. 2. Fig. 5 is a sectional plan view of the same on the line $y\ y$ in Fig. 2. Fig. 6 is a transverse section of the same, in elevation on line $z\ z$ in Fig. 4, looking in the direction of the arrow.

Like letters refer to like parts in all the figures.

This invention is designed to be an improvement on the cash indicator and register for which I filed an application for a patent on October 17, 1889, Serial No. 327,366; and it consists especially in improvements in mechanism for operating the registering-wheels, carrying mechanism therefor, mechanism for checking the momentum of the registering-wheels, and other improvements set forth hereinafter in the specification and claims.

In the construction of my improved cash indicator and register shown, A A are the sides, and A' the rear plate, which constitute the frame of the machine, which rests upon and is secured to the base B, in which a cash-drawer B' operates.

On a rod $b$ in the lower portion of the sides A A of the frame are pivoted four groups of key-levers C, C', $C^2$, and $C^3$, the group C representing cents from one to nine; the group C' multiples of cents from ten to ninety; the group $C^2$, dollars from one to nine, and the group $C^3$ multiples of dollars from ten to ninety, inclusive.

Upon the group C the foot $c$ of an upright rack-bar D rests. Upon the group C' the foot $c'$ of an upright rack-bar D' rests. Upon the group $C^2$ the foot $c^2$ of an upright rack-bar $D^2$ rests, and upon the group $C^3$ the foot $c^3$ of an upright rack-bar $D^3$ rests, each group being adapted to operate the rack-bar foot resting thereon, these rack-bars being adapted to be moved up and down in grooves $a$ in the back plate A' of the frame.

To each of the rack-bars D, D', $D^2$, and $D^3$ are secured racks $d$ and $d'$, the racks $d'$ intermeshing with the pinions $e$, secured to the indicator-wheels E, E', $E^2$, and $E^3$, mounted on the rod $e'$ across the upper part of the machine-frame, and the racks $d$ intermeshing with segmental gears F F' $F^2$ $F^3$ on the rear ends of the oscillating levers $f, f', f^2$, and $f^3$, which are mounted on the rod G across the machine-frame. On the rod G, adjacent to the levers $f, f', f^2$, and $f^3$, are also mounted gear or ratchet wheels H H' $H^2$ $H^3$, each containing sixty teeth, or any multiple of tens thereof desirable. On the outer ends of the levers $f\ f'\ f^2\ f^3$ are pivoted spring-dogs $h\ h'$ $h^2\ h^3$, adapted to engage with the teeth of the wheels H H' $H^2$ $H^3$ and actuate the same when the rack-bars D D' $D^2$ $D^3$ are raised by the operating of the key-levers, said dogs passing over the teeth in said wheels freely when the rack-bars are returning to their normal positions.

Across the machine-frame above the wheels H H' $H^2$ $H^3$ is secured a rod G', having spring-dogs $g\ g'\ g^2\ g^3$ thereon, adapted to engage with the teeth on said wheels and prevent their being moved backward. Secured to the left-hand sides of the wheels H, H', $H^2$, and $H^3$ are annular rims I I' $I^2$ $I^3$, of sufficient width to have figures marked thereon, the rims I, I', and $I^2$ being marked with six series of figures from one (1) to naught (0,) inclusive, and the rim $I^3$ with figures from 1 to 59, inclusive, as and for the purpose hereinafter set forth.

On the left-hand sides of each of the indicator-rims I I' $I^2$ are secured six carrying-points $i$ equidistant from each other.

Across the frame in the rear of the wheels H, H′, H², and H³ is a rod J, secured in bearings $j\,j'\,j$ on the machine-frame, and on this rod J are mounted sleeves J′, J², and J³, the sleeve J′ having on one end thereof an inwardly-projecting arm K, adapted to engage with and be raised by the carrying-points $i$ on the rim I, and having on its opposite end an inwardly-projecting arm $k$, having a dog L pivoted thereto adapted to engage with the teeth on the wheel H′ and move it forward when the arm K on the sleeve J′ is raised by the carrying-points $i$ on the rim I. The sleeve J² also has on one end thereof an inwardly-projecting arm K′, adapted to engage with and be raised by the carrying-points $i$ on the rim I′, and has on its opposite end an inwardly-projecting arm $k'$, having a dog L′ pivoted thereto adapted to engage with the teeth on the wheel H². The sleeve J³ also has on one end thereof an inwardly-projecting arm K², adapted to engage with and be raised by the carrying-points $i$ on the rim I², and has on its opposite end an inwardly-projecting arm $k^2$, having a dog L² pivoted thereto adapted to engage with the teeth on the wheel H³, the sleeves J² and J³ and the dog mechanism connected therewith operating in like manner as described in reference to the sleeve J′. (See Fig. 6.) The arms $k, k'$, and $k^2$ are adjustably secured to the ends of their respective sleeves so as to admit of their proper adjustment when necessary.

On the back of the frame-plate A′ are secured stops M, adapted to limit the upward movement of the dogs L, L′, and L², so as to prevent their throwing the wheels H′, H², and H³ too far around by any quick movement thereof.

At the rear of the machine-frame, below the rod J, is a rod M′, secured in bearings M² at the sides of the machine-frame. On this rod M′ are mounted, by means of sleeves M³, secured thereto, four levers N, N′, N², and N³, which have secured thereto downwardly-projecting plates $m, m', m^2$, and $m^3$, each of which plates corresponds in width with the feet $c\,c'\,c^2\,c^3$ of the upright rack-bars D, D′, D², and D³. The levers N N′ N² N³ also project forward through openings in the plate A′ beneath the wheels H H′ H² H³ and the spring-dogs $h\,h'\,h^2\,h^3$ operating thereon. On the upper faces of said levers are slightly-curved serrated racks $n$, adapted to engage when the levers are raised, as hereinafter described, with the lugs $n', n^2, n^3$, and $n^4$ on the dogs $h, h', h^2$, and $h^3$, for stopping the movement thereof at the proper point.

On the rear ends O of the key-levers are two projections O′, adapted to engage with ribs P on the rear side of the rack-bar feet, and O², above the projection O′, adapted to contact with the rear sides of the plates $m\,m'\,m^2\,m^3$, so as to raise the levers N N′ N² N³ into contact with the lugs $n', n^2, n^3$, and $n^4$ on the dogs $h, h', h^2$, and $h^3$. These projections O′ and O² are made of different lengths, as illustrated in Fig. 3, and also by the dotted lines thereon in Fig. 6, so that their action on the ribs P on the rack-bar feet and on levers N, N′, N², and N³ will correspond with the distances the key-levers move.

Across the front of the machine-frame, below the levers N N′ N² N³, is a horizontal bar P′, pivoted at its ends to the upright arms of the bell-crank levers P², mounted and adapted to oscillate on bearings P³ on the frame. Pivoted to the horizontal arms of said bell-crank levers are links $p$, which extend downward and have their lower ends pivoted to the horizontal releasing-levers Q, pivoted on stud-pins $q$ at the sides of the machine-frame, the front ends of these levers Q being connected together in front of the keys by means of a cross-bar Q′, so that the operating of the levers Q by means of pressure applied to the cross-bar Q′ moves the sliding bar P′ horizontally. The rear ends of the levers Q are provided with retracting-springs $q^2$, and also each is provided with a downwardly-projecting arm Q², which pass through openings $q'$ in the top of the base B, so as to engage with the rear end B² of the drawer B′ and lock it in a closed position. When the drawer is closed, the lower end $b'$ of the arm Q² rests upon a lug $b^2$ on the rear end B² of the drawer, as and for the purpose hereinafter set forth.

On the inside of the rear of the base B are placed springs R, which the rear of the drawer contacts with and compresses when being closed, and locked in such closed position by the engaging of the ends $b'$ of the downwardly-projecting arms Q² of the levers Q, which springs operate, when the outer ends of the levers Q are depressed, to release the drawer B′ to automatically open the same.

On the horizontal bar P′ are two series of stud-pins $r$ and $r'$, the series $r$ engaging with stud-pins $r^2$ on the series of spring-actuated dogs S, and the series of stud-pins $r'$ engaging with the stud-pins $r^3$ on the series of spring-actuated dogs T, all of said dogs S and T being pivoted to the front side of the frame-plate A′—one on each side of the upright rack-bars D, D′, D², and D³—each of said bars being provided with the ratchet-racks S′ and T′, the dogs S being adapted to engage with the racks S′ and retain the rack-bars in a raised position, and the dogs T being adapted to engage with the racks T′ as the rack-bars move downward to their normal positions and lock them in that position until released, this operation being performed by depressing the front ends of the levers Q, which operation raises the end $b'$ of the lever-arm Q² up so as to release the drawer B′, which movement of the levers Q also operates the sliding bar P′ through the links $p$ and the bell-crank lever P², moving the bar P′ horizontally toward the right, which movement of the bar P′ and the stud-pins $r$ and $r'$ thereon carries the spring-dogs S back and away from the racks S′, thereby releasing any of the bars D, D′, D², or D³ which may be at that time in a raised position, and allowing them to fall to their normal positions ready to be operated, and also permitting the springs R to throw the drawer B' open, when, the pressure upon the front ends of the levers Q being released, the rear ends of the levers Q drop to a position below their normal position when the drawer B' is in a closed position and rest upon the stops R' on the sides A A of the frame, which movement of the levers Q, operating on the sliding bar P' through the link p and the bell-crank lever P², moves the bar P' horizontally toward the left, which movement of the bar P' and the stud-pins r and r' thereon carries the spring-dogs T back and away from the racks T', so as to unlock the bars D, D', D², and D³, retaining the dogs T in that position until the drawer B' is again closed and locked.

On the base B, near one side of the frame, I secure an alarm-bell U, and on a lug U' on the base B, I pivot a bell-hammer lever V on a stud-pin u'. To the end of the bell-hammer lever V next to the bell is secured a retracting-spring v. In the rear end of one of the levers Q, I secure a stud-pin V', adapted to engage with the point of a spring-dog u on the bell-hammer lever V, so as to raise the hammer when the end of the lever Q moves down, but passing over it when being raised, so that each downward movement of the end of the lever Q actuates the bell-hammer lever, so as to ring an alarm on the bell U each time the levers Q Q are operated to release the drawer B'.

The operation of the mechanism hereinbefore described is so obvious that further description thereof is deemed unnecessary. Therefore, Having fully described my invention, so as to enable others skilled in the art to which it appertains to construct and use the same, what I claim as new, and desire to secure by Letters Patent of the United States, is—

1. The combination, in a cash indicator and register, of a series of groups of key-levers, vertically-moving bars adapted to be operated by said groups of key-levers, one bar by the key-levers of each group, oscillating levers communicating with and operated by said vertical bars, and registering-wheels and dogs pivoted to said oscillating levers and engaging with said registering-wheels, carrying-points on the registering-wheels, and sleeves connecting said registering-wheels having an arm on each end thereof, one of said arms engaging with the carrying points on one registering-wheel and the other of said arms actuating another of said registering-wheels, substantially as and for the purpose set forth.

2. In a machine for the purposes named, the combination of a series of groups of key-levers, a series of vertically-moving bars, one for each group of key-levers, registering-wheels operated by said bars, carrying-points on said wheels, and carrying-sleeves having their axis parallel to the axis of said wheels and having two arms thereon, one of which arms receives motion from the carrying-points of one wheel and the other communicates said motion to the next adjoining wheel, substantially as and for the purpose set forth.

3. The combination, in the registering-wheel mechanism of a cash indicator and register, of a series of carrying-points on the registering-wheels, sleeves on a separate shaft extending from one of said wheels to another, with an arm on each end of said sleeves engaging with the carrying-points on the registering-wheel opposite thereto and the arms on the other ends of said sleeves carrying a pawl engaging with the registering-wheel opposite thereto, and stops on the machine-frame, which limit the movements of said dogs, substantially as and for the purpose set forth.

4. The combination, in a cash indicator and register, of a series of groups of key-levers and a series of horizontal lever-racks pivoted to bearings at the rear of the machine-frame and extending forward under the registering-wheels, one under each registering-wheel, and adapted to engage when raised with the dogs operating on said wheels, plates secured to the said lever-racks, near the rear ends thereof, which engage with a projection on the rear end of each key-lever of the group over which said plate is located, such projections being of different lengths on the rear ends of the key-levers, adapted to engage with such plates when the rear ends of the key-levers are raised and actuate said lever-racks, substantially as and for the purpose set forth.

5. The combination, in a cash indicator and register, of a series of groups of key-levers and a vertically-moving bar to each of said groups of key-levers actuated by them for operating indicating and registering wheels, and a pair of spring-actuated dogs adapted to engage with racks on the sides of each of said vertically-moving bars, with lever mechanism pivoted to the base of the machine-frame and coupled to a horizontally-moving dog-actuating bar, whereby said dogs may be moved into and out of engagement with the racks on said vertically-moving bars by the operation of said lever mechanism, substantially as and for the purpose set forth.

6. The combination, in a cash indicator and register, of a locking-lever pivoted to the frame and adapted to engage with a catch on a spring-actuated cash-drawer in the base of the machine and retain it in a closed position, with horizontally-sliding dog-moving mechanism coupled to said lever and engaging with dogs entering racks on the sides of vertically-moving key-actuated bars communicating with and actuating the registering and indicating mechanism of said machine and locking said bars down upon the key-levers when the drawer is closed, whereby when the outer end of said lever is depressed the drawer is released, and when said lever returns to its normal position the dogs are withdrawn thereby from the racks in the vertically-moving bars, so as to unlock them, substantially as and for the purpose set forth.

7. The combination, in a cash indicator and register, of the groups C, C′, C², and C³ of key-levers and upright rack-bars D, D′, D², and D³, having feet $c$, $c'$, $c^2$, and $c^3$ thereon resting upon said groups of key-levers, (one of said feet resting upon each group,) with registering-wheels H I, H′ I′, H² I², and H³ I³, lever-and-dog-mechanism $f\, h$, $f'\, h'$, $f^2\, h^2$, and $f^3\, h^3$, connecting said registering-wheels and rack-bars, sleeves and carrying-pawls connecting said registering-wheels together, and indicating-wheels E, E′, E², and E³, communicating with and actuated by said rack-bars, substantially as and for the purpose set forth.

8. The combination, in a cash indicator and register, of a key-lever-actuated bar D and an oscillating lever $f$, actuated by said rack-bar D and carrying a dog $h$ and adapted to actuate a register-wheel I, with a stop-lever N, having a plate $m$ secured thereto, adapted to be engaged and actuated by the rear ends O² of the key-levers contacting with the rear side of said plate, said key-lever ends O² being of different lengths, according to the values of the keys, substantially as and for the purpose set forth.

9. The combination, in a cash indicator and register, of a key-actuated bar D and a registering-disk I on a wheel H, operatively connected with said bar D, and carrying-points $i$ on said registering-disk I, with a sleeve J, having on one end thereof an arm K, adapted to be engaged by the points $i$ on the registering-disk I, an arm $k$ on the opposite end of said sleeve J, carrying a dog L, adapted to engage with a second wheel and registering-disk, and an adjustable stop M on the machine-frame for limiting the movement of the dog L, substantially as and for the purpose set forth.

In testimony whereof I affix my signature in presence of two witnesses.

WILLIAM H. CLARK.

Witnesses:
H. J. CURTZE,
LOUIS ALBRACHT, Jr.